F. W. MEYER.
REGENERATING SYSTEM.
APPLICATION FILED MAR. 24, 1915.

1,339,903.

Patented May 11, 1920.

WITNESSES:
Fred A. Lind
D. C. Davis

INVENTOR
Friedrich W. Meyer
BY
ATTORNEY

UNITED STATES PATENT OFFICE.

FRIEDRICH W. MEYER, OF PITTSBURGH, PENNSYLVANIA, ASSIGNOR TO WESTINGHOUSE ELECTRIC AND MANUFACTURING COMPANY, A CORPORATION OF PENNSYLVANIA.

REGENERATING SYSTEM.

1,339,903. Specification of Letters Patent. Patented May 11, 1920.

Application filed March 24, 1915. Serial No. 16,677.

*To all whom it may concern:*

Be it known that I, FRIEDRICH W. MEYER, a subject of the Emperor of Germany, and a resident of Pittsburgh, in the county of Allegheny and State of Pennsylvania, have invented a new and useful Improvement in Regenerating Systems, of which the following is a specification.

My invention relates to electric railway systems wherein provision is made for the return to the source of all surplus energy developed at the vehicle in the control of motor speed during normal operation.

One object of my invention is to provide means for propelling a railway vehicle by simple and rugged apparatus which is capable of operating efficiently at a number of different speeds.

Another object of my invention is to provide means whereby the voltage of a railway distributing system may be boosted at points far removed from the source of power and whereby the load on different portions of the system may be properly distributed and equalized.

Figure 1:
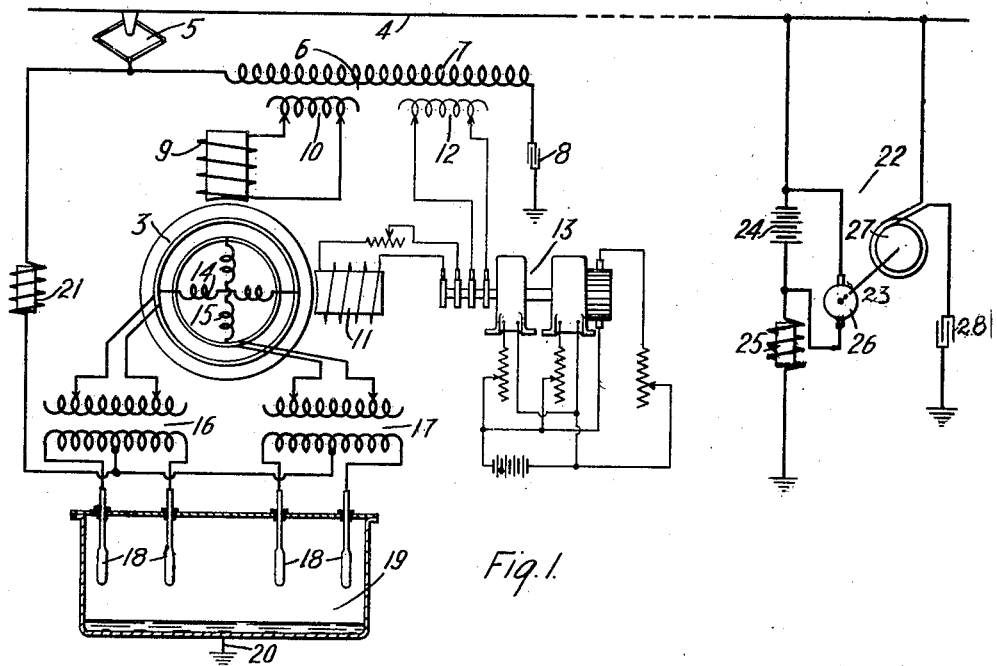
Figure 2:
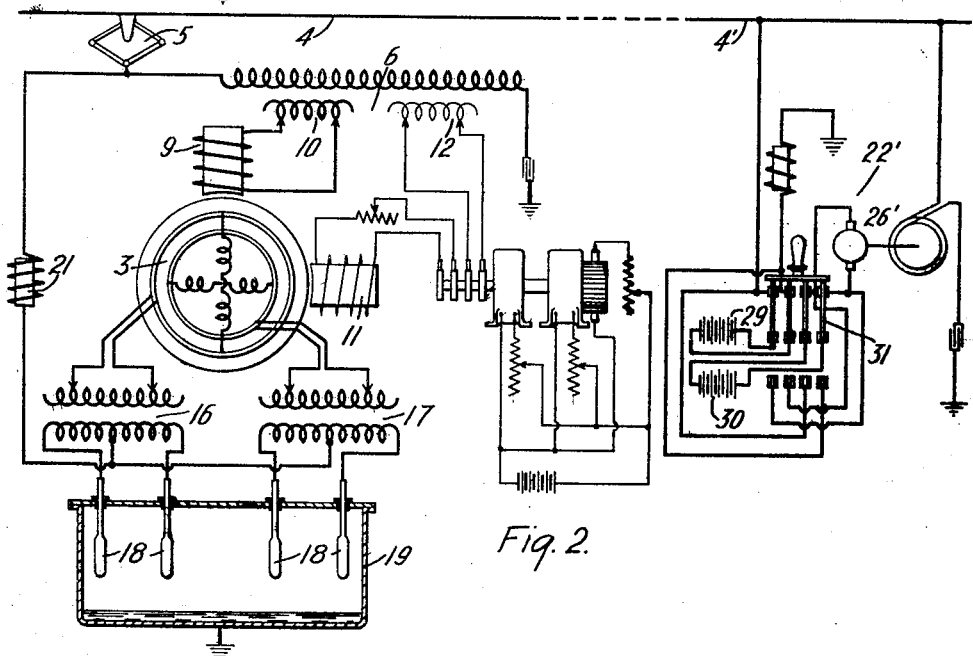

Figure 1 of the accompanying drawings is a diagrammatic view of a railway distribution system embodying one form of my invention, and Fig. 2 is a diagrammatic view of a modification of the system shown in Fig. 1.

Induction motors are well adapted for railway work because of good operating characteristics, the absence of a commutator, and the ease with which regeneration may be effected. They have the drawback, however, that good starting torque cannot be obtained without causing the motor secondary circuit to generate a comparatively high electromotive force. The ordinary method of bringing about this result is to insert starting resistances in the secondary circuit but this method is obviously wasteful. Various systems have been proposed wherein the energy which is derived from the motor secondary circuit is supplied to the primary member of another induction motor, as in the ordinary cascade arrangement, or to motors of other forms which assist in starting the vehicle. I have found that, under certain conditions, the extra starting torque of such additional machines is unnecessary and that the machines add needless weight.

I propose, therefore, to derive such an amount of energy from the secondary member of an induction motor as may be necessary to provide the desired speed and torque control and to transform said energy into direct current by suitable apparatus, preferably a rectifier, and to superpose said direct current upon the alternating current of the trolley wire. Suitable means may then be provided, either at the central station or at a substation, for removing the direct-current energy from the line and transforming it into alternating current of line frequency to be returned to the line for boosting or equalizing purposes.

Referring to the form of my invention shown in Fig. 1, current is supplied to a traction motor 3 of the induction type from a trolley wire 4 by a suitable trolley 5 through the intermediary of a regulating transformer 6. The primary member 7 of the transformer 6 has one terminal grounded through a condenser 8, preferably of the electrolytic type, for a purpose to be hereinafter pointed out. The induction motor 3 is shown as of the two-phase type, although any other form is suitable for my purpose. The main field winding 9 is supplied with current directly from a secondary member 10 of the transformer 6, and an auxiliary field winding 11 is supplied with current from a secondary member 12 of the transformer 6 through a phase-shifting device 13 of any suitable type, such that the phase of the current flowing in the winding 11 is displaced by substantially 90 electrical degrees from the current flowing in the winding 12. The secondary member of the motor 3 is provided with windings 14 and 15 displaced from each other by ninety electrical degrees and each connected to suitable slip rings at its terminals. Current is supplied from the slip rings associated with the winding 14 to an adjustable transformer 16, and current is supplied from the winding 15 to a similar transformer 17. The anodes 18 of a suitable rectifier 19, preferably of the mercury-vapor type, are severally connected to the terminals of the secondary members of the transformers 16 and 17. The cathode of the rectifier 19 is grounded, as shown at 20, and the mid-points of the secondary windings of the transformers 16 and 17 are connected to the trolley 5 through a choke coil 21 of high reactance but of low ohmic resistance. The method of operation of a motor of this type, together with its attendant apparatus, is described in detail in my Patent No. 1,275,966, issued Aug. 13, 1918, and assigned to the Westinghouse Electric & Manufacturing Company. In the practice of the present invention, I may substitute, for the specific type of split-phase motor shown, a polyphase motor of any desired character.

A substation 22 is connected to the trolley wire 4 at any suitable point and comprises a motor-generator set 23 which may be used for boosting and equalizing purposes, as will be hereinafter pointed out in detail. A storage battery 24 is connected between the trolley wire 4 and ground through a suitable choke coil 25 similar to the coil 21. The motor 26 of the motor generator set 23 is connected across the terminals of the storage battery 24. The generator 27 of the set 23 is connected from line to ground through a suitable condenser 28, a step-up transformer being employed if the trolley voltage is exceptionally high.

Having thus described my invention, the operation is as follows: When starting, the transformers 16 and 17 are adjusted for a relatively high voltage across the terminals of the secondary member 3 and the motor therefore starts with good torque, self-starting being obtained by the 90° displacement between the windings 9 and 11. The energy derived from the secondary member of the induction motor 3 is transformed into direct current by the rectifier 19 and said direct current is permitted to flow to the trolley 5 and through the choke coil 21. Alternating current from the trolley 5, however, cannot flow to the rectifier 19 because of the high reactance of the coil 21. In like manner, direct current cannot flow from the trolley to ground through the primary winding 7 of the transformer 6 because of the condenser 8. The direct current is therefore forced to flow along the trolley wire 4 and reaches ground at the substation 22 through either the storage battery 24 or the motor 26 and the choke coil 25 which coil prevents alternating current from going to ground at this point. At times of heavy starting, the amount of energy taken from the secondary member of the induction motor 3 will exceed that consumed by the motor 26, and the storage battery 24 will be charged. In like manner, during periods of deficient energy supplied from the secondary member of the induction motor, the motor 26 will derive energy from the battery 24. The generator 27 is driven by the motor 26 and serves to boost the voltage of the trolley wire 4, thus maintaining desirable operating conditions on the line.

In the form of my invention shown in Fig. 2, the car equipment is substantially the same as that shown in Fig. 1 but the substation 22 is provided with two storage batteries 29 and 30. By means of a suitable switch 31, the battery 29 is first connected to receive a charge from the trolley wire 4' while the battery 30 is driving the motor 26'. After a suitable length of time, the switch 31 is thrown to its other position, and the batteries 29 and 30 are interchanged. This operation is continued indefinitely, either by hand or automatically, so that a charged battery is at all times driving the motor 26' while the exhausted battery is acquiring a new charge from the trolley wire 4'.

While I have shown my invention in two distinct embodiments only, it will be apparent to those skilled in the art that it is susceptible of various minor changes and modifications without departing from the spirit thereof and I, therefore, desire that no limitations shall be placed thereupon except such as are imposed by the prior art or are specifically set forth in the appended claims.

I claim as my invention:

1. In an electric railway system, means for supplying energy to a vehicle in the form of alternating current, means for removing energy therefrom in the form of direct current, and means for returning the energy of said direct current to the alternating-current supply conductor.

2. In an electric railway system, means for supplying energy to a vehicle in the form of alternating current, and means for removing energy from said vehicle in the form of direct current and for superposing said direct current upon the alternating-current supply system.

3. In an electric railway system, means for supplying energy to a vehicle in the form of alternating current, means for removing energy from said vehicle in the form of direct current and for superposing said direct current upon the alternating-current supply system, and means for converting said direct-current energy into alternating current and for returning it to said system.

4. In an electric railway system, the combination with an alternating-current distributing circuit, of a vehicle provided with an induction motor, means for supplying current from said circuit to the primary member of said motor, means for rectifying alternating current derived from the secondary member of said motor in the speed regulation thereof, and means for transmitting said direct current to a fixed point and there utilizing the energy thereof.

5. In an electric railway system, the combination with an alternating-current distributing circuit, of a vehicle provided with an induction motor, means for supplying current from said circuit to the primary member of said motor, means for rectifying alternating current derived from the secondary member of said motor in the speed regulation thereof, and means for transmitting said direct current to a fixed point and there restoring the energy thereof to said alternating-current distributing circuit.

6. In an electric railway system, a distributing circuit, a source of alternating current connected thereto, a vehicle provided with two current paths across said circuit, one of which contains means for permitting only alternating-current flow and the other of which contains means for permitting only direct-current flow, an induction motor for propelling said vehicle and having its primary member connected in said alternating-current path, and means for rectifying the secondary currents of said induction motor and for supplying the rectified current to said direct-current path, whereby the energy of the secondary member of said induction motor is returned to said distributing circuit in the form of direct current superposed upon the normal alternating current thereof.

7. In an electric railway system, a distributing circuit, a source of alternating current connected thereto, a vehicle provided with two current paths across said circuit, one of which contains means for permitting only alternating-current flow and the other of which contains means for permitting only direct current flow, an induction motor for propelling said vehicle and having its primary member connected in said alternating-current path, and means for rectifying the secondary currents of said induction motor and for supplying the rectified current to said direct current path, whereby the energy of the secondary member of said induction motor is returned to said distributing circuit in the form of direct current superposed upon the normal alternating current thereof, and means for reconverting the energy of said direct current into alternating current of supply frequency at a fixed point.

8. The method of operating electric railway vehicles by induction motors which comprises supplying the primary members of said motors with alternating current from a line, transforming the current induced in the secondary members of said motors into a current of different form than alternating current, superposing said current of different form upon the normal alternating current of the line, and removing said current of different form at a fixed point in the system and utilizing the energy thereof.

9. The method of operating electric railway vehicles by induction motors which comprises supplying the primary members of said motors with alternating current from a line, transforming the current induced in the secondary members of said motors into a current of different form than alternating current, superposing said current of different form upon the normal alternating current of the line, and removing said current of different form at a fixed point in the system and reconverting the energy thereof into alternating current for the supply of said line.

10. The method of operating induction motors on moving railway vehicles which comprises supplying the primary members of said motors from a line and returning the secondary energy of said motors to the line in current of different form from that derived therefrom.

11. The method of operating induction motors which comprises energizing the primary member of said motor from a line and returning the secondary energy of said motor to said line as current of different form from that derived therefrom.

12. In a system of distribution, a source of alternating current, a distributing circuit supplied therefrom, an induction motor having its primary member connected to derive alternating current from said circuit, means for converting the energy of the secondary member of said induction motor into unidirectional current and for superposing said unidirectional current upon the alternating current in said circuit, and means for utilizing the energy of said unidirectional current at a fixed point.

13. In a system of distribution, a source of alternating current, a distributing circuit supplied therefrom, an induction motor having its primary member connected to derive alternating current from said circuit, means for converting the energy of the secondary member of said induction motor into unidirectional current and for superposing said unidirectional current upon the alternating current in said circuit, and means for reconverting the energy of said unidirectional current into alternating current of supply frequency at a fixed point and for then returning said energy to said distributing circuit.

14. In an electric railway system having propulsion motors of the induction type, means for supplying energy to the motors of a vehicle in the form of alternating current, means for rectifying the energy available in the secondary windings of said motors during under-synchronous operation thereof, and means for returning the energy of said rectified current to the alternating-current supply conductor.

15. In an electric railway system having propulsion motors of the induction type, means for supplying energy to a vehicle in the form of alternating current, means for rectifying the energy available in the secondary windings of said motors during under-synchronous operation thereof, and means for superposing the energy of said rectified current upon the alternating-current supply system.

16. In an electric railway system, a source of alternating current, a distributing circuit supplied therefrom, a vehicle motor of the induction type having its primary member connected to derive alternating current from said circuit, means for converting the energy of the secondary member of said motor, during under-synchronous operation, into unidirectional current and for superposing said unidirectional current upon the alternating current in said circuit, and means for utilizing the energy of said unidirectional current at a fixed point.

17. In an electric railway system, a source of alternating current, a distributing circuit supplied therefrom, a vehicle motor of the induction type having its primary member connected to derive alternating current from said circuit, means for converting the secondary energy of said motor, during under-synchronous operation thereof, into unidirectional current and for superposing said unidirectional current upon the alternating current in said circuit, and means for reconverting the energy of said unidirectional current into alternating current of supply frequency at a fixed point and for then returning said energy to said distributing circuit.

18. In an electric railway system, a vehicle, a source of alternating-current energy, conductors for supplying said energy to said vehicle, means for removing energy from said vehicle and supplying direct-current energy to said supply conductors, means located at a different point along said conductors for utilizing said direct-current energy, and selective means in the various circuits for preventing harmful flow of either direct or alternating current in circuits not intended therefor.

19. In a system of distribution, a source of alternating-current energy, distributing conductors connected to said source, a variable load in the form of an induction motor or motors of the type having alternating-current secondary windings, said variable load being connected to said distributing conductors so as to derive energy therefrom at different points along said distributing conductors, means for removing energy from said secondary windings and supplying direct-current energy to said alternating-current distributing conductors, means located at a different point along said conductors for utilizing said direct-current energy, and selective means in the various circuits for preventing harmful flow of either direct or alternating current in circuits not intended therefor.

20. In an electric railway system, a vehicle, a source of electrical energy, conductors for supplying said energy to said vehicle, means for removing energy from said vehicle and for returning energy to said supply conductors, said returned energy having a current form which differs from the current form of said source in such a way that the two currents of different form may be separated by selective means offering a high impedance to one and a low impedance to the other, means located at a different point along said conductors for utilizing said returned energy, and selective means in the various circuits for preventing harmful flow of either form of current in circuits not intended therefor.

21. In a system of distribution, a source of alternating-current energy, distributing conductors connected to said source, a variable load in the form of an induction motor or motors of the type having alternating-current secondary windings, said variable load being connected to said distributing conductors so as to derive energy therefrom at different points along said distributing conductors, means for removing energy from said secondary windings and for returning energy to said alternating-current supply conductors, said returned energy having a current form which differs from the current form of said source in such a way that the two currents of different form may be separated by selective means offering a high impedance to one and a low impedance to the other, means located at a different point along said conductors for utilizing said returned energy, and selective means in the various circuits for preventing harmful flow of either form of current in circuits not intended therefor.

In testimony whereof I have hereunto subscribed my name this 12th day of March, 1915.

FRIEDRICH W. MEYER.

Witnesses:
  D. C. DAVIS,
  B. B. HINES.